United States Patent
Sang et al.

(10) Patent No.: US 12,304,871 B2
(45) Date of Patent: May 20, 2025

(54) OPEN-CELLED GYPSUM CORE, GYPSUM ACOUSTIC PANEL, AND METHOD FOR MAKING SAME

(71) Applicant: KNAUF GIPS KG, Iphofen (DE)

(72) Inventors: Yijun Sang, Oak Park, IL (US); Suman Sinha Ray, Chicago, IL (US); Mark Hemphill, Hawthorn Woods, IL (US)

(73) Assignee: KNAUF GIPS KG, Iphofen (DE)

( * ) Notice: Subject to any disclaimer, the term of this patent is extended or adjusted under 35 U.S.C. 154(b) by 627 days.

(21) Appl. No.: 17/647,400

(22) Filed: Jan. 7, 2022

(65) Prior Publication Data
US 2022/0220039 A1    Jul. 14, 2022

Related U.S. Application Data

(60) Provisional application No. 63/136,977, filed on Jan. 13, 2021.

(51) Int. Cl.
| | |
|---|---|
| *C04B 38/00* | (2006.01) |
| *B32B 5/02* | (2006.01) |
| *B32B 5/18* | (2006.01) |
| *B32B 5/24* | (2006.01) |
| *B32B 13/02* | (2006.01) |

(Continued)

(52) U.S. Cl.
CPC .......... *C04B 38/0058* (2013.01); *B32B 5/022* (2013.01); *B32B 5/18* (2013.01); *B32B 5/245* (2013.01); *B32B 13/02* (2013.01); *B32B 15/046* (2013.01); *B32B 15/12* (2013.01); *B32B 29/007* (2013.01); *C04B 14/42* (2013.01); *C04B 24/38* (2013.01); *C04B 28/14* (2013.01); *C04B 38/10* (2013.01); *G10K 11/165* (2013.01); *G10K 11/168* (2013.01); *B32B 2262/101* (2013.01); *B32B 2266/049* (2016.11);

(Continued)

(58) Field of Classification Search
CPC ..... C04B 38/0058; C04B 14/42; C04B 24/38; C04B 28/14; C04B 38/10; B32B 5/022; B32B 5/18; B32B 5/245; B32B 13/02; B32B 15/046; B32B 15/12; B32B 29/007; G10K 11/165; G10K 11/168
See application file for complete search history.

(56) References Cited

U.S. PATENT DOCUMENTS

| | | |
|---|---|---|
| 1,769,519 A | 7/1930 | King et al. |
| 2,078,199 A | 4/1937 | King |

(Continued)

FOREIGN PATENT DOCUMENTS

| | | | |
|---|---|---|---|
| JP | 2002293663 A | | 10/2002 |
| JP | 2016539891 A | * | 12/2016 |
| WO | 95/16515 A1 | | 6/1995 |

OTHER PUBLICATIONS

International Search Report and Written Opinion received for PCT/IB2022/050200, mailed Apr. 14, 2022.

*Primary Examiner* — Edgardo San Martin
(74) *Attorney, Agent, or Firm* — Greer, Burns & Crain, Ltd; Philip T. Petti; Pradip Sahu

(57) ABSTRACT

An open cell set gypsum core includes an interlocking matrix of gypsum having air voids distributed therein. The air voids define cells having cell walls formed by the interlocking matrix. The interlocking matrix further includes channels distributed therein. The channels interconnect the air voids and comprise openings in the cell walls.

19 Claims, 1 Drawing Sheet

(51) Int. Cl.
    *B32B 15/04*     (2006.01)
    *B32B 15/12*     (2006.01)
    *B32B 29/00*     (2006.01)
    *C04B 14/42*     (2006.01)
    *C04B 24/38*     (2006.01)
    *C04B 28/14*     (2006.01)
    *C04B 38/10*     (2006.01)
    *G10K 11/165*    (2006.01)
    *G10K 11/168*    (2006.01)
    *C04B 111/00*    (2006.01)

(52) U.S. Cl.
    CPC ..... *B32B 2266/06* (2013.01); *B32B 2307/102* (2013.01); *B32B 2419/00* (2013.01); *C04B 2111/00629* (2013.01)

(56) References Cited

U.S. PATENT DOCUMENTS

| | | | |
|---|---|---|---|
| 3,573,947 A | 4/1971 | Kinkade et al. | |
| 4,676,835 A | 6/1987 | Green et al. | |
| 5,158,612 A | 10/1992 | Savoly et al. | |
| 5,240,639 A | 8/1993 | Diez et al. | |
| 5,643,510 A | 7/1997 | Sucech | |
| 6,342,284 B1 | 1/2002 | Yu et al. | |
| 6,387,172 B1 | 5/2002 | Yu et al. | |
| 6,409,825 B1 | 6/2002 | Yu et al. | |
| 6,443,258 B1 | 9/2002 | Putt et al. | |
| 6,481,171 B2 | 11/2002 | Yu et al. | |
| 6,494,609 B1 | 12/2002 | Wittbold et al. | |
| 6,613,424 B1 | 9/2003 | Putt et al. | |
| 6,780,356 B1 | 8/2004 | Putt et al. | |
| 6,783,587 B2 | 8/2004 | Sethuraman et al. | |
| 7,364,015 B2 * | 4/2008 | Englert | B27N 3/04 156/39 |
| 7,503,430 B2 | 3/2009 | Englert et al. | |
| 7,851,057 B2 | 12/2010 | Englert et al. | |
| 8,057,915 B2 | 11/2011 | Song et al. | |
| 8,142,915 B2 | 3/2012 | Blackburn et al. | |
| 8,262,820 B2 | 9/2012 | Yu et al. | |
| 10,125,049 B2 | 11/2018 | Lee et al. | |
| 10,245,755 B2 | 4/2019 | Yu et al. | |
| 10,407,345 B2 | 9/2019 | Yu et al. | |
| 10,662,119 B2 | 5/2020 | Stav et al. | |
| 10,683,235 B2 * | 6/2020 | Morlat | B28B 5/027 |
| 11,306,028 B2 * | 4/2022 | Yu | B32B 29/00 |
| 2004/0045481 A1 | 3/2004 | Sethuraman et al. | |
| 2004/0231916 A1 | 11/2004 | Englert et al. | |
| 2012/0167805 A1 | 7/2012 | Wittbold et al. | |
| 2019/0023612 A1 | 1/2019 | Sang et al. | |
| 2019/0023614 A1 | 1/2019 | Sang et al. | |
| 2020/0148601 A1 | 5/2020 | College et al. | |
| 2020/0180271 A1 | 6/2020 | Bailey et al. | |
| 2023/0416153 A1 * | 12/2023 | Iyer | B32B 5/18 |

* cited by examiner

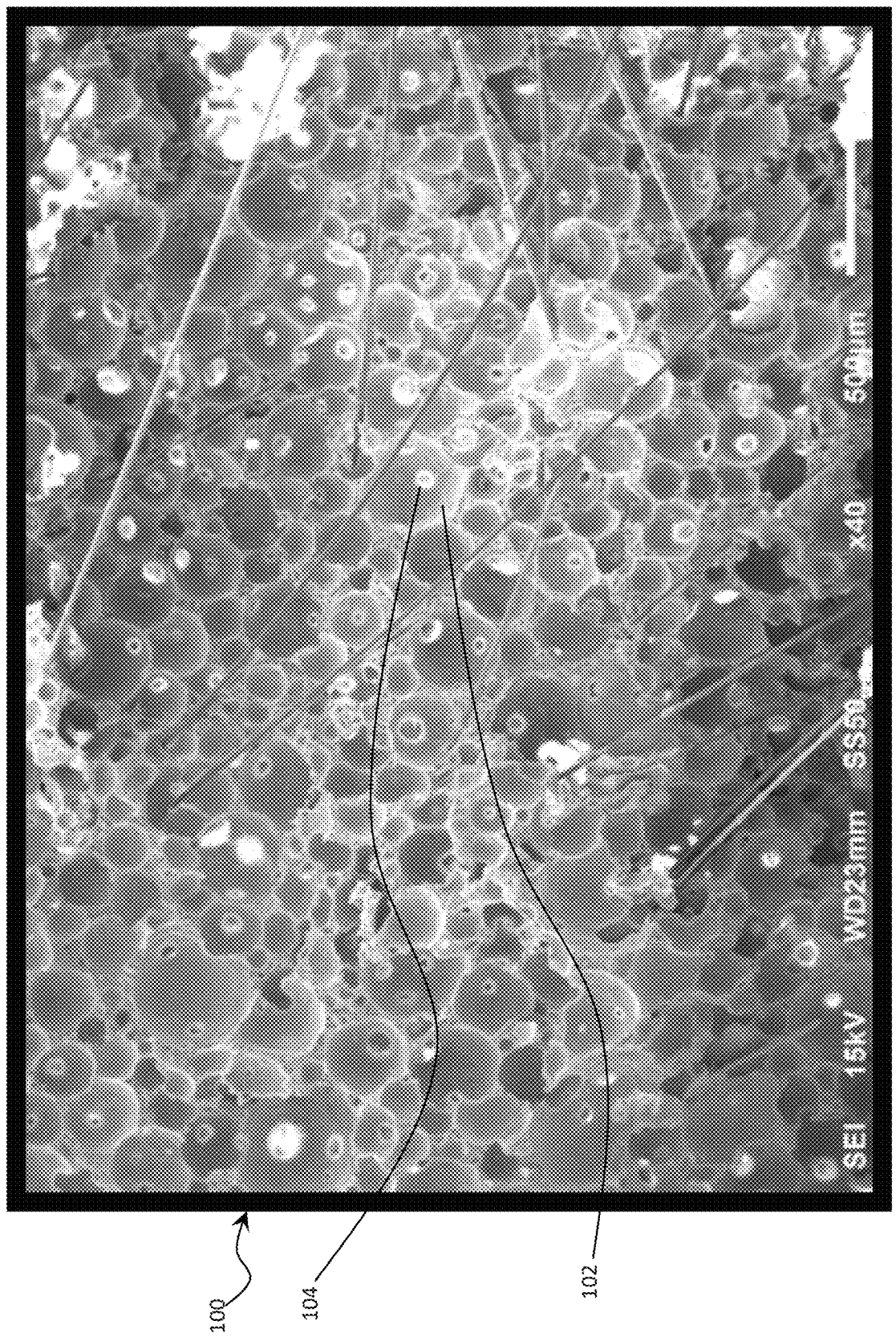

OPEN-CELLED GYPSUM CORE, GYPSUM ACOUSTIC PANEL, AND METHOD FOR MAKING SAME

REFERENCE TO RELATED APPLICATIONS

The present application claims priority to U.S. Provisional Application Ser. No. 63/136,977, filed Jan. 13, 2021, entitled OPEN-CELLED GYPSUM CORE, GYPSUM ACOUSTIC PANEL, AND METHOD FOR MAKING SAME. U.S. Provisional Application Ser. No. 63/136,977 is incorporated by reference in its entirety herein.

FIELD

The present disclosure relates to gypsum structures having improved acoustical properties. More specifically, the present disclosure relates to open-celled gypsum cores, gypsum acoustic panels, and methods for making same.

BACKGROUND

Acoustic panels, such as but not limited to ceiling tiles, wall panels and other building panels, and partitions, can be used as acoustic absorbers in various environments. Acoustic panels include an acoustic layer that is selected for acoustic absorbency as well as factors such as durability. For absorbing noise, sound enters a matrix of an acoustic layer, which matrix is defined by the acoustic layer's structure. Once the sound is inside, the matrix traps and dissipates the sound energy therein. NRC (noise reduction coefficient) of building panels can be used to define their acoustic absorption capacity.

Ideally, the panels combine acoustic absorbency with durability for long life. Mineral wool is commonly used because it provides a porous fibrous structure for absorbing sound. Other common materials used in the manufacture of acoustic panels include fiberglass, expanded perlite, clay, gypsum, stucco, calcium carbonate, paper fiber, and binder (e.g., starch or latex).

Some acoustic panels are made using a water-felting process. An aqueous dispersion of fibers, aggregates, binders, and other additives is dispensed onto a porous surface or wire where the furnish is dewatered, both by gravity and by vacuum suction. The wet mat is typically dried in a convection oven, fissured, and/or perforated to impart acoustical absorbency and then cut into desired lengths. If desired, the surface is painted to produce a finished panel.

Another process for making acoustic panels is disclosed in U.S. Pat. No. 1,769,519. A composition of mineral wool fibers, fillers, colorants, a binder such as cooked starch, and water is placed in trays covered with paper or paper-backed foil. The composition is then screeded with a forming plate to the desired thickness. A decorative surface, such as an embossed pattern, may be obtained by imparting a pattern into the surface of the cast material by use of a screed bar or a patterned roll.

Such methods of making acoustic panels utilize large amounts of water and energy. Additionally, hygroscopic binders, such as paper or starch, can result in panels that are susceptible to sag. Panel sagging can be accentuated when the panel supports insulation or other loads or when subjected to high levels of humidity and temperature. Additional process steps, such as perforation, may also increase the manufacturing cost.

Gypsum panels are less prone to sag and can be manufactured efficiently in a high-speed process. There has accordingly been a great need and potential to provide an acoustic absorber on the platform of conventional gypsum wallboard. However, gypsum is a dense material, and is not inherently an especially acoustically absorbent material. Gypsum panels can lack sufficient acoustical absorbency for use as an acoustic absorber. Gypsum panels have a very limited noise reduction function, mainly due to the closed air cells in conventional gypsum panels.

Some gypsum wallboards have been adapted for use as acoustical panels by including perforations (holes) and positioning a sound-absorbing backing sheet on the back of the perforated panel. This allows some sound to pass through the perforations to improve the noise reduction performance. An example perforation process includes formation of large (e.g., 1 cm or more in diameter) holes that are mechanically formed (e.g., drilled, bored, punched) to extend through the entire panel by an external device.

Perforating introduces several drawbacks. For example, perforation is typically an offline process, in that it is performed externally, that is, in addition to and separate from the formation of the gypsum wallboard itself. Perforation also may produce a significant amount of dust. Perforation further increases manufacturing costs of the gypsum wallboards. Additionally, while the perforations provide some weight reduction and sound absorbance, they may not be acceptable by consumers as being aesthetically pleasing.

U.S. Pat. Nos. 6,387,172 and 6,481,171 disclose acoustic gypsum compositions. Both describe the use of both fibrous calcined gypsum and non-fibrous calcined gypsum in gypsum products. Another gypsum panel having an acoustical layer is disclosed in U.S. Patent Publication No. 2004/0231916. One embodiment of this panel has an acoustic layer of foamed gypsum formed on denser gypsum material for strength. U.S. Pat. No. 7,503,430 discloses a ceiling tile manufactured on a gypsum board line that reduces dusting when cut. U.S. Pat. No. 7,851,057 discloses an acoustic panel including an interlocking matrix of set gypsum and an additive such as cellulosic fiber or lightweight aggregate. U.S. Pat. No. 8,057,915 discloses an acoustic gypsum board including a matrix of calcium dihydrate crystals and expanded perlite distributed throughout the matrix.

SUMMARY

According to one aspect of the disclosed embodiments, an open cell set gypsum core is provided. An interlocking matrix of gypsum and, optionally, reinforcing fiber has air voids distributed therein. The air voids define cells having cell walls formed by the interlocking matrix. The interlocking matrix further includes channels distributed therein. The channels interconnect the air voids and comprise openings in the cell walls.

The core may further include a reinforcing fiber distributed throughout the interlocking matrix. The gypsum may include synthetic gypsum, natural gypsum, or a combination.

According to another aspect of the disclosed embodiments, a set gypsum core is provided. The core is formed from an air-foamed stucco slurry comprising stucco, at least one uncooked starch, and an aqueous foam, the uncooked starch being in the amount of at least 4% by weight of the dry stucco. The air-foamed stucco slurry has air bubbles distributed therein. The core is set to provide an interlocking matrix of set gypsum, wherein the air bubbles form air voids distributed within the interlocking matrix, and wherein granules of the uncooked starch are distributed within the interlocking matrix between the air voids and within cell walls of the air voids. The set core is heated to at least a gelatinizing temperature, wherein the granules of the uncooked starch gelatinize to provide channels distributed within the interlocking matrix and interconnecting the air voids.

The air-foamed stucco optionally may further include reinforcing fiber. The gypsum may include synthetic gypsum, natural gypsum, or a combination.

According to yet another aspect of the disclosed embodiments, a gypsum acoustic panel is provided. The panel comprises an acoustic layer comprising an open cell set gypsum core. The open cell set gypsum core comprises an interlocking matrix of gypsum having air voids distributed therein. The air voids define cells having cell walls formed by the interlocking matrix. The interlocking matrix further has channels distributed therein, where the channels interconnect the air voids, and the channels comprise openings in the cell walls. At least one backing sheet faces an outer surface of the acoustic layer.

The open cell set gypsum core may further include reinforcing fiber disposed within the interlocking matrix. The gypsum may include synthetic gypsum, natural gypsum, or a combination.

According to yet another aspect of the disclosed embodiments, an air-foamed slurry is provided for making an acoustic panel. A slurry is formed from a mixture. The mixture comprises stucco, water, and at least one uncooked starch, the uncooked starch being in the amount of at least 4% by weight of the dry stucco. An aqueous foam comprises a foaming agent, water, and air. The water to stucco ratio (wt/wt) in the air-foamed slurry is between about 65% and about 120%.

The air-foamed slurry may further include reinforcing fiber, such as but not limited to glass fiber. The stucco may be formed from synthetic gypsum, natural gypsum, or a combination.

According to yet another aspect of the disclosed embodiments, a method for making a set gypsum core is provided. An air-foamed stucco slurry is formed comprising stucco, at least one uncooked starch, water, and an aqueous foam, the uncooked starch being in the amount of at least 4% by weight of the dry stucco, the air-foamed stucco slurry having air bubbles distributed therein. A core is formed from the air-foamed slurry. The core is allowed to set to provide an interlocking matrix of set gypsum, wherein the air bubbles form air voids distributed within the interlocking matrix, and wherein granules of the uncooked starch are distributed within the interlocking matrix between the air voids and within cell walls of the air voids. The set core is heated to at least a gelatinizing temperature, wherein the granules of the uncooked starch gelatinize and dissolve into the water to provide channels distributed within the interlocking matrix and interconnecting the air voids.

The air-foamed stucco slurry may include reinforcing fiber, which is disposed within the interlocking matrix of the set gypsum core. The stucco may be formed from synthetic gypsum, natural gypsum, or a combination.

According to yet another aspect of the disclosed embodiments, a method for making an acoustic panel is provided. A slurry comprises stucco at least one uncooked starch, and water, the uncooked starch being in the amount of at least 4% by weight of the dry stucco. A foam is added to the slurry to provide an air-foamed slurry, the air-foamed stucco slurry having air bubbles distributed therein. A continuous strip of the air-foamed slurry may be formed, and the strip may be cut to form the acoustic panel. The gypsum is allowed to set to provide an interlocking matrix of set gypsum, wherein the air bubbles form air voids distributed within the interlocking matrix, and wherein granules of the uncooked starch are distributed within the interlocking matrix between the air voids and within cell walls of the air voids. The set gypsum matrix is heated to at least a gelatinizing temperature, wherein the granules of the uncooked starch gelatinize to provide channels distributed within the interlocking matrix and interconnecting the air voids.

The slurry may include reinforcing fiber, which is disposed within the interlocking matrix of the set gypsum core. The stucco may be formed from synthetic gypsum, natural gypsum, or a combination.

Other features and advantages of the invention will be apparent from the following specification taken in conjunction with the following FIGURE.

BRIEF DESCRIPTION OF THE DRAWING

The present disclosure will become more fully understood from the detailed description and the accompanying FIGURE, wherein:

FIG. 1 is a scanning electron microscope (SEM) of a cross-section of a gypsum core having open cells, according to an embodiment of the present disclosure.

DETAILED DESCRIPTION

Introduction

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspects of the invention to the embodiments illustrated.

Unless otherwise noted, concentrations used in this description refer to percentages by weight based on the dry weight of stucco (calcium sulfate hemihydrate).

Embodiments disclosed herein provide, among other things, an open cell set gypsum core, and methods for making and using the same. The open cell set gypsum core can provide an acoustical product alone, e.g., as a mold or core, or as an acoustic component, such as an acoustic layer sandwiched between two layers such as glassmats, of an acoustic product such as an acoustic panel. The open cell set gypsum core includes an interlocking matrix including gypsum. As the interlocking matrix includes gypsum, it can also be referred to as an interlocking gypsum matrix. An "open-cell" structure with respect to an example set gypsum core refers to a structure having a plurality of voids (cells) formed internally in the structure (e.g., distributed throughout an interior of the structure), which voids individually are not completely closed to neighboring voids, but instead are interconnected with one or more neighboring voids via channels that are also formed internally in the structure.

The open cell gypsum core may optionally include reinforcing fiber disposed within the interlocking gypsum matrix. An example reinforcing fiber is made from a material that does not set as does the set gypsum. Setting of the gypsum results in the reinforcing fibers being bound by and distributed throughout the set gypsum. This can improve the flexural strength and acoustical performance of the matrix.

An acoustic path is provided in the interior of the open-cell structure, i.e., from one void through a channel to at least another, neighboring void, and often through yet another channel to yet another void, then to another void, etc. The resulting paths, which can be complex or tortuous paths through the structure, provide improved sound absorption capacity in an interlocking gypsum matrix, without the need to externally perforate the interlocking matrix as in some conventional gypsum panels (though perforation can be provided if desired). Sound absorption capacity can be verified by, for instance, measuring an estimated noise reduction coefficient (e-NRC).

Additionally, example open cell set gypsum cores and acoustic panels incorporating such gypsum cores can have a relatively low density, while exhibiting good compressive strength. Example open cell set gypsum cores and acoustic panels incorporating such gypsum cores can be produced in batches using continuous methods generally analogous to those for producing gypsum wallboard and acoustic panels, but without the need to separately perforate the finished cores or panels.

To form an open-cell structure, uncooked starch is added to an air-foamed stucco slurry including stucco. For instance, the uncooked starch can be added to the air-foamed stucco slurry after, during, or prior to air-foaming, or in any combination. The uncooked starch is distributed through the air-foamed stucco slurry.

The stucco in the air-foamed stucco slurry sets (that is, hydrates or rehydrates) due to reaction of the stucco with water to harden, forming a set gypsum core having an interlocking matrix therein. The interlocking matrix includes air voids due to the air bubbles provided by the air foam, and these air voids define cell walls in the set gypsum core. Air bubble size can be controlled to provide, among other things, an optimal opening for sound to enter the core as well as optimal paths to provide optimal attenuation.

The uncooked starch can be in the form of granules. When the stucco sets to form a set gypsum core the uncooked starch granules are distributed in the set gypsum cell walls. When the set gypsum is then dried at a temperature sufficient to gelatinize the uncooked starch ("gelatinizing temperature") the starch granules are gelatinized, dissolved in water, forming openings (holes) in the cell wall.

The openings in the cell wall provide channels connecting neighboring air voids, resulting in an open-celled structure for absorbing sound. This open-cell structure can define tortuous (e.g., complex or maze-like) acoustic paths for sound impinging on the set gypsum core, providing an acoustic absorbing structure having good noise reduction performance. Example acoustic absorbing structures can operate similarly to Helmholtz resonators.

Open Cell Set Gypsum Core

Example open cell set gypsum cores that exhibit acoustic properties will now be described. Example set gypsum cores can be provided as a monolithic product (e.g., as a mold or monolithic core) or incorporated as one or more acoustic layers in an acoustic product such as an acoustic panel, including any acoustic panels described herein or any other suitable acoustic panel.

An example set gypsum core includes an interlocking matrix of gypsum (calcium sulfate dihydrate) and optionally reinforcing fiber. For example, the interlocking matrix can include a crystalline gypsum matrix; that is, a matrix of calcium sulfate dihydrate crystals (also referred to as crystalline hydrated gypsum). The crystalline gypsum matrix imparts strength to the set gypsum core.

Calcined gypsum, also known as stucco or calcium sulfate hemihydrate, can be used in a slurry that sets to make the example set gypsum core in example methods. Any calcined gypsum comprising calcium sulfate hemihydrate or water-soluble calcium sulfate anhydrite or both can be useful. Synthetic gypsum, natural gypsum, or a combination may be used to provide (e.g., form) the calcined gypsum. Example synthetic gypsum includes but is not limited to gypsum from sulfide oxidation such as may be recovered flue gas desulfurization. Natural gypsum includes but is not limited to gypsum from natural rock or minerals such as clay, dolomite, limestone, alabaster, selenite, etc.

Calcium sulfate hemihydrate produces at least two crystal forms, the alpha and beta forms. Beta calcium sulfate hemihydrate is commonly used in gypsum board panels, but it is also contemplated that layers made of alpha calcium sulfate hemihydrate are also useful for example set gypsum cores. Either or both of these forms may be used to create an example set gypsum core. The gypsum in the set gypsum core in example embodiments can be at least 80% gypsum based on the weight of the set gypsum core, but greater or smaller percentages of gypsum may be used.

Reinforcing fibers optionally may be provided or included in the interlocking matrix, e.g., distributed throughout the matrix. The reinforcing fibers are non-setting components that improve the set gypsum core and enhance the green strength of the core and/or an acoustic product (e.g., acoustic panel) incorporating the core. Example reinforcing fibers such as organic fiber, cellulosic fiber, glass fiber or mineral wool fiber may be used. Reinforcing fibers add strength to the set gypsum core while minimizing overall weight.

The interlocking matrix has air voids distributed therein, e.g., throughout the interlocking matrix. Air voids, also referred to as foam voids, are voids (openings) disposed throughout the interlocking matrix that result from stable air bubbles in an air-foamed slurry that are present when the stucco sets so that the interlocking matrix forms around the air bubbles. FIG. 1 shows an interior portion of a core 100 showing example air voids 102.

The air voids respectively define cells having cell walls formed by the structure of the interlocking matrix. For example, the cell walls of each cell can generally surround an air void, defining a volume of the air void. Most of the air bubbles are generally spherical in shape, resulting in generally spherical air voids (generally circular in cross-section), though some of the air bubbles may be partially compressed, resulting in various ovoid shapes (oval or elliptical in cross-section).

Air voids enhance acoustic properties of the set gypsum core by providing an increased surface area, defined by the inner cell walls of the air voids, over which impinging sound waves that enter the air voids can travel. Additionally, air voids reduce the density of the set gypsum core, and thus lower the overall weight of the set gypsum core as compared to a set gypsum core lacking air voids.

The size and/or number of air bubbles in the air-foamed slurry can be configured, such as by control of an air rate and/or a flow rate of an air foam, selection of a foaming agent, etc., to control the air void sizes and/or proportion of air voids (e.g., a proportion of volume) in the interlocking matrix. Both the density and the acoustic properties of the set gypsum core can be configured by controlling the size and/or number of air bubbles. For instance, the size and/or proportion of air voids can be controlled to provide a longer and more complex path for entering sound waves. Water reducing agents, e.g., dispersants, can also be selected and included in the air-foamed slurry to affect density and acoustic properties in the set gypsum core.

In some example set gypsum cores, the air voids have a distribution of diameters having a mean (average) of between about 20 microns and about 200 microns. For instance, the mean air void diameter may have a lower bound that can be any of at least about 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, or 190 μm, in combination with an upper bound that is greater than the lower bound and at most about 200 μm, 190 μm, 180 μm, 170 μm, 160 μm, 150 μm, 140 μm, 130 μm, 120 μm, 110 μm, 100 μm, 90 μm, 80 μm, 70 μm, 60 μm, 50 μm, 40 μm, or 30 μm. The distribution of air void diameters can be configured such that a majority of the air voids have a diameter at or near the mean diameter, though this is not required in all embodiments. The air voids collectively may have, in some embodiments, a volume proportion of from about 60% to about 80% of the overall volume of the set gypsum core. For instance, the volume proportion may have a lower bound that can be any of at least about 60%, 62%, 64%, 66%, 68%, 70%, 72%, 74%, 76%, or 78%, in combination with an upper bound that is greater than the lower bound and at most about 80%, 78%, 76%, 74%, 72%, 70%, 68%, 66%, 64%, or 62%. Proportion of air voids can be determined, for instance, based on density. The shape, diameter and proportion of air voids can be evaluated, for example, using a scanning electron microscope (SEM) at a suitable magnification (e.g., 40× (FIG. 1), 100×, etc.).

Conventionally, air voids formed in gypsum cores are closed cell, in that they are generally not interconnected with one another, but instead they essentially completely enclose their respective air voids within the interlocking matrix. In such conventional acoustic products, it can be difficult or impossible for external sound impinging on a facing surface of the set gypsum core (or acoustic product incorporating the set gypsum core) to enter the interlocking matrix and thus enter most or all of the air voids, or for sound to travel between neighboring air voids, without at least an additional perforation step. Other openings that may be present within a gypsum matrix, such as water voids, are too small (e.g., 5 microns or less), few in number, and/or otherwise insufficient to address the above problems.

It is known to externally perforate set gypsum cores and/or acoustic products to open some of the air voids to facing surfaces and/or to neighboring air voids, e.g., along a direction of perforation. For example, pin-hole sized perforations are known, and often are combined with positioning a sound-absorbing backing on an acoustic layer. However, the holes created by external perforations are relatively large and are consistent in their size, orientation, and/or positioning due to the perforation methods used (resulting in relatively less complex acoustical paths), which negatively affects acoustic absorption. Further, such perforations require additional manufacturing steps, and generally are not aesthetically pleasing.

By contrast, in example embodiments disclosed herein, the interlocking matrix further includes channels distributed therein that interconnect the air voids. For example, as shown in the core 100 in FIG. 1, the channels pass through the structure of the interlocking matrix include openings 104 that are formed in the cell walls of the air voids 102 within the interlocking matrix. For example, a channel can include at least a first opening formed in a cell wall of one of the air voids and a second opening formed in a cell wall of another one of the air voids, e.g., a neighboring (adjacent) air void. The channel optionally may include a third opening formed in a cell wall of a third air void, a fourth wall formed in a cell wall of a fifth air void, etc.

The channels can be formed within and pass through the structure of the interlocking matrix, terminating at the cell wall openings. In this way, the channels interconnect the air voids to one another. For instance, a channel may define a continuous path from a first opening in a cell wall of a first air void, through the channel within the interlocking matrix, and to a second opening in a cell wall of a second air void. This interconnects the first and second air voids. If the channel also terminates at cell wall openings of third, fourth, etc. air voids, the channel can interconnect each of these air voids (first, second, third, fourth, etc.). Individual channels can define multiple continuous paths. Any combination of neighboring air voids can include cell wall openings and be continuously connected via one or more channels.

The distribution of such air voids, openings, and channels in various positions and orientations throughout the set gypsum core, creates complex, maze-like open structures within and throughout the set gypsum core, internally connecting a large portion of the air voids to other air voids. These open structures provide acoustic paths for sound waves to travel, increasing the acoustic properties of the set gypsum core. Further, continuous paths (that is, paths not completely broken by the interlocking matrix) can be provided between the channels, air voids, and one or more facing surfaces of the set gypsum core. For instance, the air voids, which may be generally spherical or ovoid in shape, may be configured to absorb sound, and further the channels may define multiple paths for sound to travel among and within the air voids, e.g., in a complex distribution.

The distribution of air voids and interconnecting channels (including cell wall openings) can vary. The position and orientation of the interconnecting channels, for instance, can be less consistent and more varied (e.g., more complex, more random, and/or less predictable) than the throughholes made using external perforation. In some embodiments, this distribution of air voids and interconnecting channels may approach a random or pseudorandom distribution. The paths for sound to travel may be complex paths, for instance providing a generally maze-like structure, through the interior of the set gypsum core. In some embodiments, the defined path(s) may provide or perform similarly to a Helmholtz resonator or other acoustic damper.

As shown by example in FIG. 1, a large proportion of the air voids can be interconnected to one another by channels having openings in the cell walls of the air voids. For example, at least 30% of the air voids may be interconnected to at least one other of the air cells by at least one of the channels. For instance, the percentage of interconnected air voids may be at least about 30%, 35%, 40%, 45%, 50%, 55%, 60%, 65%, 70%, 75%, 80%, 85%, 90%, or 95%. In some example embodiments, substantially all (i.e., about 100%) of the air voids may be interconnected to at least one other of the air cells by at least one of the channels.

As another example, at least 30% of the air voids may have at least one of the openings of a channel formed on a cell wall. For instance, the percentage of air voids having at least opening of a channel may be at least about 30%, 35%, 40%, 45%, 50%, 55%, 60%, 65%, 70%, 75%, 80%, 85%, 90%, or 95%. In some example embodiments, the cell walls of substantially all (i.e., about 100%) of the air cells may have at least one of the openings of a channel formed therein.

The acoustic properties of the set gypsum core may be affected by the relative size of the openings to those of the air voids. Larger channel openings relative to the size of the air voids may provide improved sound travel between the air voids and thus within the interlocking matrix, with a possible trade-off of overall strength of the set gypsum core. For instance, the channels may include openings in the air voids having a first mean size, e.g., a mean diameter between about 10 microns and about 50 microns. For instance, the mean channel diameter may have a lower bound that is at least about 10 µm, 15 µm, 20 µm, 25 µm, 30 µm, 35 µm, 40 µm, or 45 µm, in combination with an upper bound that is greater than the lower bound and at most about 50 µm, 45 µm, 40 µm, 35 µm, 30 µm, or 25 µm. The air voids may have diameters in a first distribution having a second mean size, e.g., a mean diameter between about 20 microns and about 200 microns. For instance, the mean air void diameter may have a lower bound that is at least about 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, or 190 µm, in combination with an upper bound that is greater than the lower bound and at most about 200 µm, 190 µm, 180 µm, 170 µm, 160 µm, 150 µm, 140 µm, 130 µm, 120 µm, 110 µm, 100 µm, 90 µm, 80 µm, 70 µm, or 60 µm, 50 µm, 40 µm, or 30 µm. Alternatively or additionally, the mean of the first distribution may be, for instance, at least 25% of the mean of the second distribution. For instance, the mean of the first distribution may be a percentage of the mean of the second distribution that that is at least about 25%, 30%, 35%, 40%, 45%, or 50%.

Openings in the cell walls may be generally circular or elliptical in cross-sectional shape. For instance, the openings may be generally elliptical in cross-sectional shape with an eccentricity less than 0.5. For instance, the eccentricity of the openings may have an upper bound that is less than or equal to about 0.5, 0.45, 0.40, 0.35, 0.30, 0.25, 0.20, 0.15, 0.10, or 0.05, with a lower bound of about 0.00. In some embodiments, openings may be substantially circular in cross-sectional shape (eccentricity of about 0.00).

As example embodiments provide air voids and connecting channels that can connect the air voids to one another and to a facing surface of the set gypsum core, it is not required to externally perforate the set gypsum core to allow impinging sound waves to travel within the channels and air voids. Thus, the example set gypsum core may be free of external perforations, such as those provided by pin holes in some conventional acoustic panels. However, if desired, the set gypsum core may be additionally perforated.

Example set gypsum cores can have improved acoustic properties relative to conventional acoustic products, and have a relatively low density, while still exhibiting sufficient strength. In some embodiments, the set gypsum may have a density of from about 15 pound-force per cubic feet (pcf) to about 25 pcf, or greater. For instance, the density may have a lower bound that is at least about 15 pcf, 16 pcf, 17 pcf, 18 pcf, 19 pcf, 20 pcf, 21 pcf, 22 pcf, 23 pcf, or 24 pcf, in combination with an upper bound that is greater than the lower bound and at most about 25 pcf, 24 pcf, 23 pcf, 22 pcf, 21 pcf, 20 pcf, 19 pcf, 18 pcf, 17 pcf, or 16 pcf. The example set gypsum core may further have a compressive strength of at least about 50 pounds-force per square inch (psi), and in some examples is at least about 210 psi. For instance, the compressive strength may have a lower bound that is at least about 50 psi, 60 psi, 70 psi, 80 psi, 90 psi, 100 psi, 110 psi, 120 psi, 130 psi, 140 psi, 150 psi, 160 psi, 170 psi, 180 psi, 190 psi, 200 psi, 210 psi, 220 psi, 230 psi, 240 psi, or 250 psi, and an upper bound that is greater than the lower bound and at most 250 psi, 240 psi, 230 psi, 220 psi, 210 psi, 200 psi, 190 psi, 180 psi, 170 psi, 160 psi, 150 psi, 140 psi, 130 psi, 120 psi, 110 psi, 100 psi, 90 psi, 80 psi, 70 psi, or 60 psi. The example set gypsum core (as a nonlimiting example, a set gypsum core having a thickness of between about 0.5 inch and about 0.75 inch) may further have an estimated noise reduction coefficient (e-NRC) of at least about 0.30, according to ASTM E1050-98, and in some examples is at least about 0.46. For instance, the e-NRC may have a lower bound that is at least about 0.30, 0.35, 0.40, 0.45, 0.50, 0.55, 0.60, 0.65, 0.70, or 0.75, with an upper bound that is greater than the lower bound and at most about 0.75, 0.70, 0.65, 0.60, 0.55, 0.50, 0.45, 0.40, or 0.35.

The set gypsum core having acoustic properties may be formed from a composition embodied in an air-foamed stucco slurry. This mixture provides a precursor for the set gypsum core. Generally, the air-foamed stucco slurry includes a stucco slurry, which may be combined with an aqueous foam.

Stucco Slurry

Stucco slurry (also referred to as gypsum slurry) may be formed, for instance, inside a mixer such as but not limited to a pin or pinless main mixer during a manufacturing process. However, the mode of introduction of ingredients into the mixer may vary. For example, various combinations of components may be pre-mixed before entering the mixer, e.g., one or more dry ingredients and/or one or more wet ingredients may be pre-mixed in any suitable manner prior to entry into the mixer where the stucco slurry is formed as set forth herein. By "added to," or "included in" it will be understood that ingredients may be combined with one or more other ingredients in any suitable manner within the mixer, prior to entering the mixer, subsequent to leaving the mixer, or in any combination of within the mixer, prior to entering the mixer, or subsequent to leaving the mixer. A mixer can be embodied in one or multiple mixers, and references herein to a mixer can likewise refer to multiple mixers.

The stucco slurry includes calcium sulfate hemihydrate (stucco), water, at least one uncooked starch, and optionally one or more additional components as discussed below. Stucco may be added to the stucco slurry in an amount that is, as a nonlimiting example, between about 80% and about 90% by weight of the total solids in the stucco slurry.

Optional reinforcing fibers can be added to the stucco slurry in an amount of at least about 0.5% by weight of the dry stucco. In some embodiments, reinforcing fibers can be added in an amount between about 0.5% and about 5% by weight of the dry stucco. For instance, the reinforcing fibers may be added to the stucco slurry in an amount by weight of the dry stucco having a lower bound that is at least about 0.5%, 1.0%, 1.5%, 2.0%, 2.5%, 3.0%, 3.5%, 4.0%, 4.5%, or 5.0%, with an upper bound that is greater than the lower bound and is at most about 5.0%, 4.5%, 4.0%, 3.5%, 3.0%, 2.5%, 2.0%, 1.5%, or 1.0%. Example materials for stucco and reinforcing fibers that may be added to the stucco slurry are provided herein. In some example stucco slurries, up to 5% glass fiber by weight of the dry stucco is added to the stucco slurry to provide the reinforcing fibers.

The size of the reinforcing fibers may be selected to have a sufficient length to improve strength while limiting build up in a mixer during manufacture.

Example long reinforcing fibers are from about ¼" in length to about 1 inch, though it is contemplated that such fibers may be outside of this range. Some natural fibers, such as cellulose, may be limited in size. They can be considered reinforcing fibers if they are longer than average for that fiber type.

Starches are carbohydrates containing two types of polysaccharides: linear amylose and branched amylopectin. Starches generally are known in the art to be added to a stucco slurry for binding a resulting gypsum panel core to facing materials described herein and/or to enhance compressive strength of the final product. For instance, since starch contains glucose monomers containing three hydroxy groups, starch can provide multiple sites for hydrogen bonding to gypsum crystals. However, according to example embodiments herein, uncooked starches are included in the stucco slurry to provide channels interconnecting air voids in the set gypsum core.

Uncooked as used in example compositions and methods herein refers to the starches being in granular form. Starches can be classified as either cooked or uncooked. Uncooked starches are cold water insoluble and have a semi-crystalline structure. Starch granules are semicrystalline, e.g., as seen under polarized light, and are insoluble at room temperatures. By contrast, in cooked starches (also referred to as pregelatinized starches), the starch in placed in water and heated (or cooked) so that the crystalline structure of the starch granules melts and dissolves in water (gelatinization). Gelatinization can be determined, e.g., by the disappearance of birefringence under a microscope with a polarized light. "Uncooked" as used herein means that the starch has a degree of gelatinization of less than about 5% (e.g., less than about 3%, or less than about 1%, or about zero) before being added into the stucco slurry.

Some example uncooked starches can be provided, for instance, by wet milling. Example uncooked starches include cereal starches, root starches, and tuber starches, such as but not limited to corn starch, wheat starch (e.g., A type, B type), pea starch, tapioca starch, or potato starch. Starches may be native starches, chemically modified (e.g., acid-modified), substituted starches having substituted groups, or a combination.

In some example embodiments, the uncooked starches in the stucco slurry may have a hot water viscosity between about 20 Brabender Units (BU) and about 300 BU, and/or a mid-range peak viscosity between about 120 BU and about 1000 BU. For instance, uncooked starches may have a hot water viscosity having a lower bound that is at least about 20 BU, 30 BU, 40 BU, 50 BU, 60 BU, 70 BU, 80 BU, 90 BU, 100 BU, 110 BU, 120 BU, 130 BU, 140 BU, 150 BU, 160 BU, 170 BU, 180 BU, 190 BU, 200 BU, 210 BU, 220 BU, 230 BU, 240 BU, 250 BU, 260 BU, 270 BU, 280 BU, or 290 BU, with an upper bound that is greater than the lower bound and at most about 300 BU, 290 BU, 280 BU, 270 BU, 260 BU, 250 BU, 240 BU, 230 BU, 220 BU, 210 BU, 200 BU, 190 BU, 180 BU, 170 BU, 160 BU, 150 BU, 140 BU, or 130 BU, and/or a mid-range peak viscosity with a lower bound that is at least about 120 BU, 160 BU, 200 BU, 240 BU, 280 BU, 320 BU, 360 BU, 400 BU, 440 BU, 480 BU, 520 BU, 560 BU, 600 BU, 640 BU, 680 BU, 720 BU, 760 BU, 800 BU, 840 BU, 880 BU, 920 BU, or 960 BU, with an upper bound that is greater than the lower bound and at most about 1000 BU, 960 BU, 920 BU, 880 BU, 840 BU, 800 BU, 760 BU, 720 BU, 680 BU, 640 BU, 600 BU, 560 BU, 520 BU, 480 BU, 440 BU, 400 BU, 360 BU, 320 BU, 280 BU, 240 BU, 200 BU, or 160 BU. Examples of such uncooked starches and example methods for determining hot water viscosity and/or peak viscosity are disclosed in U.S. Pat. Pub. 2019/0023612, which is incorporated by reference. Including uncooked starches having hot water and/or peak viscosities in this range in an example stucco slurry may improve core strength of the set gypsum core or acoustic product including the acoustic layer. Some uncooked starches can natively exhibit such hot water and/or peak viscosity, or be provided, for instance, by modifying (e.g., acid-modifying or otherwise modifying) starches (e.g., native uncooked starches or starches modified in other ways), for instance as disclosed in U.S. Pat. Pub. 2019/0023612, including any combination of such uncooked starches. However, uncooked starches may be used in example stucco slurries herein that exhibit hot water viscosities outside of this example range; e.g., less than about 20 BU or greater than about 300 BU, and/or midrange peak viscosities less than about 120 BU or greater than about 1000 BU, including in some examples one or more of the uncooked starches disclosed in U.S. Pat. Pub. 2019/0023612 that have not been modified to fall within or otherwise do not fall within this range. Combinations of uncooked starches within this hot water viscosity range and/or midrange peak viscosity and beyond such ranges may also be used in example stucco slurries.

The uncooked starch granules may be combined in the stucco slurry with other starches, including one or more additional uncooked (non-gelatinized) starches and/or cooked (gelatinized) starches. For instance, additional starch may be added to the stucco slurry for use as a binder during hydration of the stucco. Additionally or alternatively, a portion of the uncooked starch itself may provide a binder for the stucco slurry, while another portion provides channels. Example pregelatinized starches that may be used for binders are provided in U.S. Pat. App. Pub. No. 2019/0023612, which is incorporated by reference.

It is possible that some portion of the starch used in an example air-foamed stucco slurry may be cooked when the stucco slurry sets, even though another portion of the starch will be uncooked and in granular form. As further described herein, during manufacture of example set gypsum cores and acoustic products incorporating set gypsum cores, the uncooked starch in the air-foamed stucco slurry provided for forming channels will undergo gelatinization after the gypsum sets and the interlocking matrix is formed.

In a stucco slurry according to example embodiments, the uncooked starch is in the amount of at least about 4% by weight of the dry stucco. For instance, the amount of uncooked starch by weight of the dry stucco may have a lower bound that is any of at least about 4.0%, 4.5%, 5.0%, 5.5%, 6.0%, 6.5%, 7.0%, 7.5%, 8.0%, 8.5%, 9.0%, 9.5%, or 10%.

Properties of the set gypsum core can optionally be modified by the use of one or more additives added to the stucco slurry, as in other gypsum precursor compositions. For example, a set accelerator can be an optional component of an example stucco slurry. One such gypsum set accelerator includes 95% calcium sulfate dihydrate co-ground with 5% sugar and heated to 250° F. (121° C.) to caramelize the sugar and can be made according to U.S. Pat. No. 3,573,947, herein incorporated by reference. Another typical gypsum set accelerator is calcium sulfate dihydrate freshly ground with sugar or dextrose at a ratio of about 2.5 to 7.5 pounds of sugar per 100 pounds of calcium sulfate dihydrate and can be made according to U.S. Pat. No. 2,078,199, herein incorporated by reference. The use of any gypsum set accelerator, or combinations thereof, in appropriate amounts is contemplated for use in example embodiments.

Set accelerators may be provided in the stucco slurry in amounts such as between about 0.5% and about 4% by weight of the dry stucco.

Binders may optionally be added to the stucco slurry (in addition to the granular uncooked starch described above) to improve the integrity of the interlocking matrix. Binders may also be provided in some embodiments to improve bonding of the acoustic product to an optional facing material.

Example binders include starches, such as corn or wheat starch, a latex, such as polyvinyl acetate, acrylic, or styrene butadiene latexes, or combinations thereof. One example useful binder is an acrylic binder that forms a self-linking acrylic emulsion, such as RHOPLEX HA-16, available from Rohm and Haas (Philadelphia, PA). Acrylic binders are optionally used in amounts of from about 0.5% to about 5%, and in some examples from about 0.8% to about 1.5%, by weight of the dry stucco.

Either migrating or non-migrating starches may be useful. Non-migrating starches are also applicable by solution directly to a backing layer (e.g., paper) to enhance bonding with the set gypsum core. Starch used for binding in the stucco slurry, which can be provided in addition to the uncooked starch disclosed above, can be present in amounts of from about 0.5 to about 10 by weight based on the dry stucco weight. Examples of pregelatinized, non-migrating starches useful for an acoustic layer include GemGel Starch (Manildra Group USA, Shawnee Mission, Kans.) and PCF1000 (Bunge North America, St. Louis, MO). Examples of non-pregelatinized (uncooked), non-migrating starches include Minstar 2000 and Clinton 106 Corn Starch, acid-modified corn starch Clinton 260 (from Archer Daniels Midland Co., Decatur, IL). Examples of migrating starches include Hi-Bond Starch and LC-211 starch (both from Archer Daniels Midland Co., Decatur, IL).

In some examples, binders may be provided in the stucco slurry in amounts less than about 4% by dry weight of the stucco, such as between about 0.5% and about 3% by dry weight of the stucco.

explained above, it will be appreciated that the granular uncooked starch described above may bind the interlocking matrix as well as generate openings in the cell walls of air voids in the interlocking matrix as disclosed herein. In some example embodiments, the uncooked granular starch may be provided in the stucco slurry in an amount (e.g., by weight) of at least a 2× multiple of an amount used for binding the interlocking matrix, as provided above.

The stucco slurry may further include a water reducing agent or dispersant that enhances the fluidity of the slurry and makes it flowable when less water is added. The selection of water reducing agent (dispersant) can affect sound adsorption performance of the set gypsum core. Naphthalene sulfonates, polynaphthalene sulfates, melamine compounds, and polycarboxylate ethers (PCEs) are examples of water reducing agents that may be included in the slurry, though other water reducing agents can be used. Example water reducing agents include PCEs such as Coatex (Arkema) and EthaCryl (Lyondell Chemical Co., Houston, TX), and polynaphthalene sulfates such as DiloFlo GW (GEO Specialty Chemical, Lafayette, IN).

Water reducing agents or dispersants may be provided in the stucco slurry in amounts such as, as nonlimiting examples, between about 0.01% and about 2% by dry weight of the stucco. Where the water reducing agent is added in the form of a liquid, amounts can be calculated based on the dry solids weight.

The stucco slurry may optionally include a sagging-resistant agent to promote green (wet) strength and/or dimensional stability. Example sagging-resistant agents may include organic acids. An example sagging-resistant agent is a trimetaphosphate compound, an ammonium phosphate having 500-3000 repeating units, and a tetrametaphosphate compound, including salts or anionic portions of any of these compounds. Some example sagging-resistant agents are disclosed in commonly-owned U.S. Pat. No. 6,342,284. In some embodiments, a sagging-resistant agent includes sodium trimetaphosphate. The sagging-resistant agent can be used in any suitable amount, for example, in a range having a lower bound from about 0.004%, 0.01%, or higher, and an upper bound of about 0.3%, about 0.5%, about 1%, about 2% or lower, by weight based on the dry weight of the ingredients. Boric acids, tartaric acids and combinations thereof also can be used as sagging resistant agents, as is known in the art.

The stucco slurry may further comprise a retarder. For instance, salts and organic compounds are known to modify a set time of a slurry, varying widely from accelerating to retarding gypsum hydration. Example retarders include a 1% solution of pentasodium salt of diethylenetriaminepentaacetic acid (Versanex™ 80, commercially available from Dow Chemical Company, Midland, Michigan). Some example retarders are disclosed in U.S. Pat. Nos. 3,573,947 and 6,409,825.

The retarder may be added to the stucco slurry, as a nonlimiting example, in an amount on a solid basis of about 0.01% to about 0.05% by weight based on the dry weight of the stucco.

Forming the Stucco Slurry

To form the stucco slurry, dry ingredients may be combined including calcium sulfate hemihydrate (stucco), the uncooked starch, and optionally one or more additional dry ingredients (such as but not limited to the reinforcing fiber), examples of which are disclosed herein, to provide a mixture. Dry ingredients can be blended, e.g., in a mixer such as but not limited to a powder mixer to provide a dry mixture. In some example embodiments, dry components other than stucco may be dispersed over the dry stucco as it moves along a conveyor.

The dry ingredients may be added in a slurry mixer to water and/or to a wet mixture including water and one or more optional liquid ingredients (disclosed herein) to obtain the stucco slurry. For instance, water may be provided in an example stucco slurry in a water to solid ratio (by weight) between about 0.60 and about 1.20). For instance, the water to solid ratio may have a lower bound that is at least about 0.60, 0.65, 0.70, 0.75, 0.80, 0.85, 0.90, 0.95, 1.00, 1.05, 1.10, or 1.15, in combination with an upper bound that is greater than the lower bound and at most about 1.20, 1.15, 1.10, 1.05, 1.00, 0.95, 0.90, 0.85, 0.80, 0.75, 0.70, or 0.65.

Sufficient water can be added to make a flowable slurry. It has been found that an amount of water used to slurry the stucco is sufficient to gelatinize the uncooked starch to form the openings as described herein. However, a greater amount of water can be used. For example, an amount of water in the stucco slurry may be provided that exceeds 20% of the amount needed to hydrate all of the calcined gypsum to form calcium sulfate dihydrate, so that excess water is provided after this hydration. For instance, the excess percentage of water (by weight) in the stucco slurry may have a lower bound that is any of at least about 20%, 25%, 30%, 35%, 40%, 45%, or 50%.

An example water-to-solid ratio for hydrating the calcined gypsum can be determined based on the weight of the water compared to the weight of the total solids in the formulation. An optimal amount of water may also be determined, at least in part, by the type of calcined gypsum that is used. For instance, alpha-calcined stucco uses less water to achieve the same flowability as beta-calcined stucco. A water to solid ratio in an example stucco slurry ranges from about 0.6:1 to about 1.2:1. If the calcined gypsum is primarily a beta hemihydrate, the water to solid ratio may be, for example, from about 0.7:1 to about 2:1, and in some examples from about 0.9:1 to 1.5:1.

In some embodiments, one or more of the dry ingredients (e.g., all or a portion of the dry ingredients) can be blended in a mixer, e.g., powder mixer, to provide a dry mixture prior to addition to the water or wet mixture. Additional dry ingredients can be added to the dry or wet mixture after mixing of other ingredients such that mixing is provided in multiple stages. All or a portion of the liquid ingredients, if any, can be added directly to the water or wet mixture before, during, or after addition of one or more of the dry ingredients. For example, one or more of the liquid ingredients can be added to the water to form a wet mixture, which can then be combined with the dry mixture in the slurry mixer to provide the stucco slurry. As another example, water may be combined with the dry mixture, and during or after combining with the water, one of more of the liquid ingredients can be added in the slurry mixer to provide the stucco slurry.

The process water can affect the properties of both the slurry and the set gypsum matrix. Salts and organic compounds can modify the set time of the slurry, varying widely from accelerating to retarding gypsum hydration. Some impurities lead to irregularities in the structure as the interlocking matrix of dihydrate crystals forms, reducing the strength of the set product. Good quality water without contamination can be used to improve product strength and consistency. However, lower-quality water, such as but not limited to tap water, can also be used.

Aqueous Foam

The aqueous foam can be added to the stucco slurry to provide the air-foamed stucco slurry before, after, or as the stucco slurry is mixed (e.g., to obtain a homogeneous slurry). In some embodiments, an aqueous foam may be pregenerated by combining a foaming agent with water and air, for instance in a foam generator, and then combined with the stucco slurry downstream of the slurry mixer, e.g., at a discharge of the slurry mixer. For instance, aqueous foam can be added to the stucco slurry as it exits (discharges from) the slurry mixer or thereafter to provide fluidity to the mix. In other embodiments, the aqueous foam can be combined in situ. For instance, the foaming agent can be added to the stucco slurry in the slurry mixer, where high shear agitation or mixing generates bubbles. Example methods for combining stucco slurries with aqueous foam are disclosed in U.S. Pat. Nos. 5,643,510, 6,494,609, and 7,851,057, each of which is incorporated by reference herein. Other methods for combining stucco slurries with aqueous foam may be used, as will be appreciated by those of ordinary skill in the art.

The total mixing time for providing the stucco slurry and the air-foamed slurry should be sufficient to yield a substantially uniform mixture. However, the total mixing time should be less than the set time of the slurry.

Air bubbles in the aqueous foam promote the formation of air voids in the set gypsum matrix to improve the acoustic absorption. Additionally, the air bubbles reduce the density of the set gypsum core. Providing a density equal to or less than about 25 pcf for the set gypsum core or the acoustic layer of an acoustic product, as a nonlimiting example, further provides a sufficient thinness to the cell walls of the air cells to allow the uncooked starch to form the channels connecting the air cells.

The aqueous foam can be provided by combining a foaming agent with water and air. For instance, the foaming agent, water, and air can be combined in a high shear foam mixing apparatus, such as a foam generator. Conventional foaming agents known to be useful in gypsum products may be added to the aqueous foam. The foaming agent may be selected so that stable air bubbles (foam cells) are distributed in the aqueous foam and the air-foamed stucco slurry to form stable air voids in the set gypsum core. Any suitable foaming agent for providing stable air bubbles may be used. An example foaming agent is a surfactant such as stable soap, so that a stable soap solution is provided. Other surfactants such as unstable soaps can be added to the aqueous foam in addition to the stable soap. Example foaming agents include alkyl ether sulfates and sodium laureth sulfates, such as STEOL® CS-230 (Stepan Chemical, Northfield, IL), foaming agents available commercially from GEO Specialty Chemicals in Ambler, PA, and others disclosed in, for example, U.S. Pat. Nos. 4,676,835; 5,158,612; 5,240,639; and 5,643,510, as well as in PCT Intl. Pub. WO 95/16515 (Jun. 22, 1995).

The foaming agent is added to the aqueous foam in an amount sufficient to obtain the desired density in the set gypsum core. For example, the foaming agent may be present in amounts of about 0.003% to about 2.0%, and in some examples from about 0.005% to about 1.5% by weight, based on the weight of the dry stucco.

A foam stabilizer may be added to the air-foamed stucco slurry in a suitable amount. Example foam stabilizers are disclosed in U.S. Pat. No. 7,851,057, which is incorporated by reference herein.

The foaming agent and the water can be combined (e.g., mixed) to provide a foaming agent solution in the aqueous foam. For example, an example aqueous foam can include a foaming agent solution having a foaming agent concentration of, as a nonlimiting example, between about 0.5% and about 2.5% by weight. Some example foaming agent solutions include a 1% soap solution (stable soap, unstable soap, or a combination of stable and unstable soap). A combination of stable soap and unstable soap, for instance, can be used to control the amount of air added and the size of the air bubbles. The water in the foaming agent solution may be any suitable water, e.g., filtered water, tap water, etc. In some embodiments, the combined water in the air-foamed slurry, including the water from the stucco slurry and the additional water in the foaming agent solution, can be provided in a water to stucco ratio between about 60% and about 150% by weight. For instance, the water to stucco ratio (by weight) may have a lower bound that is at least about 60%, 70%, 80%, 90%, 100%, 110%, 120%, 130%, or 140%, in combination with an upper bound that is greater than the lower bound and at most about 150%, 140%, 130%, 120%, 110%, 100%, 90%, 80%, or 70%.

To provide air-foaming with stable air bubbles, an example aqueous foam includes a mixture of air and the foaming agent solution, such as but not limited to a stable soap solution. The air rate and flow rate can be selected to provide an optimal air bubble size and air bubble proportion in the air-foamed stucco slurry. The air rate and/or flow rate can be adjusted according to a target core density, as will be appreciated by those of ordinary skill in the art. The amount and/or type of foaming agent used can affect how much air is incorporated into the set gypsum core.

Preparing a Set Gypsum Core

The prepared air-foamed slurry can provide a composition that can be formed into a gypsum core using a molding or casting process. In an example method, after the aqueous foam is added to the slurry (or at least a portion thereof) to provide (at least a portion of) the air-foamed slurry, the air-foamed slurry can be poured between two glassmat facing sheets to make an acoustic product. As another example, the provided air-foamed slurry can be dispersed, e.g, discharged, poured, etc., into a mold or otherwise between and/or onto one or more surfaces, which may be sized and arranged based on the desired configuration. Any suitable molding or casting process known for forming gypsum molds, gypsum panels, or acoustic products may be used to distribute the air-foamed slurry, illustrative examples of which are provided herein.

The dispersed air-foamed stucco slurry is allowed to set (hydrate) to provide a set gypsum core including the interlocking matrix of set gypsum. For instance, the precursor core can be maintained under conditions that are sufficient for the calcined gypsum in the air-foamed stucco slurry to hydrate, curing or hardening to form the interlocking matrix of set calcium sulfate dihydrate in the set gypsum core. If non-setting reinforcing fibers are included in the air-foamed slurry the reinforcing fibers are distributed within the interlocking matrix to strengthen the matrix.

The stable air bubbles in the air-foamed slurry form stable air voids in the set gypsum core that are distributed within the interlocking matrix. For instance, when the calcium sulfate hemihydrate (stucco) sets to form calcium sulfate dihydrate, air voids are left behind from the foam after the gypsum is set or interlocking gypsum crystals are formed. The air voids also result in a lower density (lighter weight) product.

Additionally, when the stucco has set, all the uncooked starch granules, which were mixed in the (liquid) air-foamed slurry, are distributed within the interlocking matrix of the set core. These uncooked starch granules are disposed between the air voids and within cell walls of the air voids. Without wishing to be bound or limited by theory, it is believed that the interlocking matrix, including the cell walls of the air voids, forms around the uncooked starch granules. Additionally, and without wishing to be bound by theory, the uncooked starch granules are believed to be disposed in excess water that itself is disposed within the interlocking matrix.

The gypsum core, e.g., the set gypsum core, is heated to at least a gelatinizing temperature, such that the granules of the uncooked starch gelatinize to provide the channels that are distributed within the interlocking matrix and interconnect the air voids. The gelatinizing temperature is a temperature sufficient to cause the uncooked starch within the interlocking matrix to gelatinize. The gelatinizing temperature can depend on the uncooked granular starch that is added to the stucco slurry.

The temperature for heating the gypsum product, including the set gypsum matrix, should be sufficient to heat the granules of the uncooked starch to the gelatinizing temperature, but less than a temperature that results in calcination of the hydrated gypsum of the set gypsum matrix back to the calcium sulfate hemihydrate or anhydrite form. For example, the gelatinizing temperature for the uncooked starch may be at least 170° F. For instance, the gelatinizing temperature may have a lower bound that is at least about 170° F., 180° F., 190° F., 200° F., 210° F., 220° F., 230° F., 240° F., 250° F., 260° F., 270° F., 280° F., 290° F., 300° F., 310° F., 320° F., 330° F., 340° F., 350° F., 360° F., 370° F., 380° F., 390° F., 400° F., 410° F., 420° F., 430° F., 440° F., 450° F., 460° F., 470° F., 480° F., 490° F., 500° F., 510° F., 520° F., 530° F., 540° F., or 550° F.

As another example, the heating temperature may be at least about 170° F. but less than or equal to about 550° F., and in some example embodiments the heating temperature may be between about 350° F. and about 450° F. For instance, the heating temperature may have a lower bound that is at least about 170° F., 180° F., 190° F., 200° F., 210° F., 220° F., 230° F., 240° F., 250° F., 260° F., 270° F., 280° F., 290° F., 300° F., 310° F., 320° F., 330° F., 340° F., 350° F., 360° F., 370° F., 380° F., 390° F., 400° F., 410° F., 420° F., 430° F., 440° F., 450° F., 460° F., 470° F., 480° F., 490° F., 500° F., 510° F., 520° F., 530° F., or 540° F., in combination with an upper bound that is greater than the lower bound and at most about 550° F., 540° F., 530° F., 520° F., 510° F., 500° F., 490° F., 480° F., 470° F., 460° F., 450° F., 440° F., 430° F., 420° F., 410° F., 390° F., 380° F., 370° F., 360° F., 350° F., 340° F., 330° F., 320° F., 310° F., 300° F., 290° F., 280° F., 270° F., 260° F., 250° F., 240° F., 230° F., 220° F., 210° F., 200° F., 190° F., or 180° F.

Heating may take place in a single stage or in multiple stages, each of which may occur at heating temperatures in the ranges disclosed above. If multiple heating stages are used, an example heating may include a first heating at a first heating temperature such as (as a nonlimiting example) between 350° F. and 450° F., and a second heating at a second heating temperature, which optionally may be a lower temperature than the first temperature, such as (as a nonlimiting example) between 300° F. and 400° F. The amount of heating time (single stage or multiple stages) can be determined based on, for instance, the heating temperature, the size/weight of the set gypsum matrix, and/or the amount of excessive water.

Without wishing to be bound by theory, it is believed that excess water from the slurry (that is, water in excess of that needed for hydration of the calcium sulfate hemihydrate to calcium sulfate dihydrate) may be present after the gypsum is allowed to set, so that heating the set gypsum matrix to at least the gelatinization temperature may cause the gelatinized starch granules to dissolve in the excess water, and that the dissolved starch granules migrate into the gypsum matrix. This excess water may be driven off by evaporation at the end of drying.

Set gypsum cores having an open cell structure according to example embodiments can be embodied in monolithic products such as molds or sandwiched between two glass-mats having desired acoustic properties. Additionally, example set gypsum cores having an open cell structure can be embodied in one or more acoustic layers for an acoustic product such as but not limited to a gypsum acoustic panel, e.g., acoustic ceiling tile, wall panel, other surface panel, etc.

For example, gypsum acoustic panels may optionally include one or more facing materials coupled to the acoustic layer to support the acoustic layer during manufacture by transferring stresses across the facing material, especially while the acoustic panel is wet. Such facing materials can be analogous to face paper commonly used in gypsum wallboard manufacture. As used herein, a "front face" is an outer surface or face of an acoustic layer that is adjacent to the space where sound absorption is desired (e.g., it faces the direction of incoming sound to be absorbed). Example acoustic layers may include more than one face that can provide the front face. A "back face" is the outer surface or face that is opposite the front face. Because of the open-cell structure of example acoustic layers disclosed herein, sound impinging on an outer surface of the acoustic layer can travel to the acoustic layer's interior, including the interior air voids, without the need to perforate one or more surfaces. Further, as opposed to some conventional acoustic panels that include perforated surfaces, a sound-absorbing backing sheet is not required.

The facing material can include a front facing material, a back facing material, or both. In some embodiments, the back facing material may be a normal wallboard paper, such as manila paper or kraft paper, non-woven glass, metallic foil, or combinations thereof. An example of a non-woven glass facing material is Johns Manville Dura-Glass Mat Series 5000 (Denver, CO). Where paper is selected as a back face facing material, multi-ply paper, such as conventional wallboard paper, may be useful. The number of plies optionally varies, e.g., from 1-8 plies, depending on the paper chosen. For example, at least one backing sheet may face an outer surface of the acoustic layer such as the back face. The backing sheet may be disposed directly on the acoustic layer, or indirectly, with one or more additional layers disposed between the acoustic layer and the backing sheet.

Another example facing material is a scrim layer. The scrim layer can be positioned, for example, on the front face adjacent to the acoustic layer (the set gypsum core). A scrim layer can also be provided on the back face. For example, the scrim layer may be porous to facilitate attachment of the set gypsum core and to facilitate drying. Any suitable material that provides support for the acoustic layer and has expansion properties compatible with the facing material (if used) can be useful as scrim material. Example embodiments include non-woven fiberglass scrims, woven fiberglass mats, other synthetic fiber mats such as polyester, and combinations thereof.

Other embodiments can include facing materials that are acoustically transparent. A non-woven glass or fabric is an example of an acoustically transparent material useful as front face facing material. The front face facing material can be bondable to a gypsum core formed by the slurry using any known binder. An example facing material is a non-woven glass mat JM 5022 (Johns Manville, Denver, CO).

Some example embodiments use a single type of material for both front and back facing material. In other example embodiments, a scrim layer and optionally one or more additional layers may be provided on the front face and a paper sheet and optionally one or more additional layers may be provided on the back face.

The gypsum acoustic panel may include a densified layer, described in more detail below, that has a greater density than the acoustic layer. The densified layer can be positioned between the acoustic layer and the backing sheet, and can include set gypsum.

Additional example methods for making an acoustic product, such as but not limited to an acoustic panel, will now be described. An example method in some embodiments can be a batch process. In other embodiments the method may be an individual process.

In an example method, an air-foamed slurry is prepared for a set gypsum core as described above. For instance, or more liquid materials, e.g., dispersant, retarder, sagging-resistant materials, etc., may be pre-mixed in a slurry mixer or other mixer with water to provide a wet mixture and combined with another (e.g., dry) mixture, e.g., including stucco, uncooked granular starch, and optional dry materials such as reinforcing fibers, set accelerators, etc., prepared in, for instance, a powder mixer, to provide the stucco slurry. Liquid and dry ingredients can be combined in various orders and/or stages. Some materials may be provided as either liquid or dry ingredients, and such ingredients can be combined appropriately with other ingredients.

The aqueous foam including water, air, and the foaming agent, can be pregenerated, for instance in a foam generator, and added to the slurry, e.g., at the discharge of the mixer, to provide an air-foamed slurry. The mixing time for the stucco slurry and the air-foamed slurry should be sufficient to yield a uniform slurry, but less than the set time of the slurry.

In other example methods, the wet mixture can be mixed with the aqueous foam (pregenerated or mixed in situ) to form a process solution. The process solution can then be combined with the dry mixture to provide the air-foamed slurry. In both examples, the mixing time to provide the air-foamed slurry should be sufficient to yield a uniform slurry, but less than the set time of the slurry.

A continuous strip of the air-foamed slurry may be formed. For example, the wet slurry mixture may be dispersed, e.g., poured, from the mixer containing the wet slurry mixture (e.g., a slurry mixer), combined with the aqueous foam to form the air-foamed slurry, and the air-foamed slurry may then be spread evenly onto a facing material that is positioned to receive the slurry. This continuous strip forms the acoustic layer (set gypsum core layer) when set. Additional layers may be added.

The facing material can be provided (e.g., formed, sized, etc.) to provide one or more facing layers. Example materials for the facing layers include one or more sheets such as backing sheets, scrim layers, etc. A nonlimiting example facing material is glass-mat. The facing material may be disposed (directly or indirectly) on any surface to receive the slurry, a nonlimiting example of which being an upper surface of a conveyor belt.

For instance, the facing material, if used, can be positioned on the conveyor belt to receive the gypsum slurry. The (air-foamed) gypsum slurry can be poured onto the facing material using a continuous process similar to that used to make other gypsum panels. From the slurry mixer, the slurry can be transferred to the facing material using a flexible conduit. The gypsum slurry can be made sufficiently fluid so that it will spread over the surface of the backing material with little or no spreading necessary. If a facing material is applied to another face, it can be applied next, for instance while the gypsum slurry is still fluid, sandwiching the slurry between the two facing materials. The gypsum core, and any optional covering materials, if present, can then pass under a forming bar to make the gypsum core a uniform thickness.

If an optional densified layer is to be provided, the stucco slurry may be divided into a main stream and a slip stream, where the stucco slurry in the slip stream has a greater density than that of the main stream, and then both the stucco slurry in the main stream and the slip stream can be combined with the aqueous foam. In some example embodiments, the densified layer may be formed by forming a continuous strip from (either) slip stream on the facing material. The acoustic layer can then be formed on (e.g., over) the facing material, from the main stream.

The gypsum in the air-foamed slurry material is allowed to set, as explained above, to provide an interlocking matrix of set gypsum. As a result of this setting, the air bubbles form air voids distributed within the interlocking matrix, and granules of the uncooked starch are distributed within the interlocking matrix between the air voids and within cell walls of the air voids. If reinforcing fiber is included in the dispersed air-foamed slurry, the reinforcing fiber is distributed throughout the interlocking matrix.

When the gypsum core has set sufficiently to achieve desired green strength to be easily handled, the gypsum product, e.g., the acoustic panel, can be cut and transferred (e.g., using a conveyor) to a heater such as but not limited to a kiln for heating and drying. The kiln may optionally include multiple zones to achieve selected heating and drying conditions. Alternatively, multiple heaters and dryers may be used, e.g., in series, with the gypsum product being transferred among the multiple heaters/dryers.

By heating the gypsum product in the heater, the set gypsum matrix is heated to at least the gelatinizing temperature so that the granules of the uncooked starch gelatinize. As explained herein, the gelatinization of the uncooked starch granules provides channels that are distributed within the interlocking matrix and interconnect the air voids. To remove additional excess water if needed, the gypsum product, including the set gypsum matrix, may be dried at a suitable drying temperature.

The gypsum product (e.g., acoustic panel) can be formed (e.g., cut) to any desirable size. Sizes can vary as needed. Example areas for the cut panels can be m×n, where m is any width between about 4 ft and about 5.4 ft, and n is any length between about 8 ft and about 12 ft. A nonlimiting example size for the formed acoustic panel is about 4 ft×12 ft. Example thicknesses for the formed acoustic panel are between about 0.5 inches and about 1.0 inches. However, these dimensions (m, n, thickness) can be greater or smaller.

As mentioned above, it is not necessary to separately (externally) perforate the acoustic material (set gypsum core) or the acoustic panel incorporating the set gypsum core to obtain good sound absorbency. Thus, perforation of the set gypsum core and/or one or more facing materials in the acoustic panel is optional and can be omitted to reduce the number of steps taken to manufacture the acoustic product. This reduces time, waste material, and cost. However, if additional, external perforation is desired, such perforation can optionally be performed, e.g., using perforations having depth and spacing similar to those known to an artisan.

The resulting gypsum product can be embodied in, for instance, acoustic ceiling tiles (acoustic ceiling panels) or acoustic gypsum panels (e.g., wall panels or other surface panels). Acoustic ceiling panels can be applied to a ceiling using methods known to those of ordinary skill in the art. Similarly, acoustic wall panels or other acoustic surface panels can be applied to a wall or other surface using methods known to those of ordinary skill in the art.

Example 1

A foamed gypsum core was made from an air-foamed stucco slurry according to the formulation listed in Table 1 below. The water to stucco ratio in the air-foamed stucco slurry was 0.85 by weight. The dry ingredients (stucco, accelerator, starch, and glass fiber) in Table 1 were mixed and added into the liquid ingredients to provide the stucco slurry. The mixture was soaked for five seconds, and then mixed at Speed II using a Hobart mixer for twenty seconds.

Air bubbles were made in a pregenerated aqueous foam by mixing air and a 1% of stable and 1% of unstable soap solution in a foam generator. The air rate was 5.0 L/min, and the flow rate of soap solution was 40 lb/min. The aqueous foam was combined with the wet mixture in the Hobart mixer to provide the air-foamed stucco slurry.

TABLE 1

| Foamed Gypsum Core Formulation | |
|---|---|
| Stucco (g) | 250 |
| Accelerator (g) | 2.5 |
| Uncooked starch (Clinton 260) (g) | 15 |
| Glass fiber, ½" (g) | 4.75 |
| Sodium trimetaphosphate 10% solution (g) | 5 |
| Dispersant (Coatex) (g) | 0.5 |
| Retarder (Versenex 80) (g) | 0.06 |
| Water (g) | 163 |
| Foam time (sec) | 10 |

The air-foamed stucco slurry was poured from the Hobart mixer into a glass-mat envelope with a thickness of ¾ inches (¾"), and was allowed to set. The set gypsum core was heated at 440° F. for 12 min, followed by 380° F. for 13 min. The sample heated gypsum core was then dried at 110° F. overnight.

The cross-section of the sample was then examined using scanning electron microscopy (SEM). As shown by example in FIG. 1, openings (holes) (~30 µm diameter) were formed on the cell wall of the air voids.

The openings on the cell wall of the air voids were demonstrated to provide channels between the air voids, changing the closed-cell structure into an open-cell structure. The example open-cell structure provided a tortuous or complex path between the air voids formed by the air bubbles. The tortuous or complex path among the open-celled air voids provided improved sound absorption capacity and provide a significant improvement of the noise reduction performance of the gypsum core, as illustrated by the measured e-NRC value in Table 2, below.

The Noise Reduction Coefficient (NRC) is a measure of sound absorption property for a product. For instance, an NRC value of 0.7 means that approximately 70% of sound was absorbed by the product, while 30% was reflected back into the environment. The estimated noise reduction coefficient (e-NRC) of the dried gypsum core sample was measured using an impedance tube and is a direct correlator of NRC. e-NRC was measured by ASTM E1050-98, and compressive strength was measured using an MTS system (Model #SATEC). The load was applied continuously and without a shock at a speed of 0.04 inch/mmn (with a constant rate between 15 to 40 psi/s).

Results of the measurements are listed in Table 2, below. Without perforation, the sample had a good e-NRC of 0.46 at a density of 22.8 pcf. The sample also had a good compressive strength of 210 psi.

TABLE 2

| Measurements of Set Gypsum Core | | |
|---|---|---|
| Density (pcf) | Compressive strength (psi) | e-NRC |
| 22.8 | 210 | 0.46 |

Example 2

To compare the influence of different water reducing agents (dispersants) on sound adsorption performance, foamed gypsum cores having either polycarboxylate ether (POE) or polynaphthalene sulfate as a dispersant were made from an air-foamed stucco slurry according to the formulations listed in Table 3 below and using the method described above in Example 1.

TABLE 3

| Foamed Gypsum Core Formulation with Different Dispersants | | |
|---|---|---|
| Ingredients | Slurry A | Slurry B |
| Stucco (g) | 250 | 250 |
| Accelerator (g) | 2.5 | 2.5 |
| Uncooked starch (Clinton 260) (g) | 15 | 15 |
| Glass fiber, ½" (g) | 4.75 | 4.75 |
| Sodium trimetaphosphate 10% solution (g) | 5 | 5 |
| Dispersant (g) | Polycarboxylate ether (Coatex) 0.5 | Polynaphthalene sulfate (DiloFlo) 2.5 |
| Retarder (Versenex 80) (g) | 0.06 | 0.06 |

TABLE 3-continued

Foamed Gypsum Core Formulation with Different Dispersants

| Ingredients | Slurry A | Slurry B |
| --- | --- | --- |
| Water (g) | 163 | 163 |
| Foam time (sec) | 10 | 10 |

Results of the measurements are listed in Table 4, below. Changing the water reducing agent (dispersant) from polycarboxylate ether to polynaphthalene sulfate lowered the e-NRC from 0.50 to 0.36 at a comparable density, demonstrating that particular dispersants such as PCE may provide improved acoustic absorption performance in set gypsum cores and acoustic panels.

TABLE 4

Measurements of Set Gypsum Core

| Dispersant | Density (pcf) | e-NRC |
| --- | --- | --- |
| Slurry A: Polycarboxylate ether (Coatex) | 21.8 | 0.50 |
| Slurry B: PolyNaphthalene sulfate (DiloFlo) | 21.90 | 0.36 |

Embodiments disclosed herein provide, among other things, open cell set gypsum cores, set gypsum cores, methods for making set gypsum cores, gypsum acoustic panels, methods for making acoustic panels, and air-foamed slurries, as described herein. Example methods can be used to produce gypsum-based acoustic tiles, such as but not limited to acoustic ceiling and wall tiles.

Embodiments disclosed herein provide, among other things, an open cell set gypsum core comprising: an interlocking matrix of gypsum, the interlocking matrix having air voids distributed therein, the air voids defining cells having cell walls formed by the interlocking matrix; the interlocking matrix further having channels distributed therein, the channels interconnecting the air voids, the channels comprising openings in the cell walls. The core may optionally further include reinforcing fiber that is distributed throughout the interlocking matrix. In addition to any of the above features in this paragraph, at least 30% of the air cells may be interconnected to another of the air cells by at least one of the channels. In addition to any of the above features in this paragraph, the cell walls of at least 30% of the air cells may have at least one of the openings formed therein. In addition to any of the above features in this paragraph, the cell walls of substantially all of the air cells may have at least one of the openings formed therein. In addition to any of the above features in this paragraph, the openings may be generally circular or elliptical in cross-sectional shape. In addition to any of the above features in this paragraph, the openings may be substantially elliptical in cross-sectional shape with an eccentricity less than 0.5. In addition to any of the above features in this paragraph, the openings may be generally circular in cross-sectional shape. In addition to any of the above features in this paragraph, each of the channels may terminate in at least one opening in one or more of the cell walls. In addition to any of the above features in this paragraph, each of a plurality of the channels may comprise a first opening in a first cell wall of a first air void and a second opening in a second cell wall of a second air void. In addition to any of the above features in this paragraph, at least 30% of the channels may be connected to at least one other of the channels via the air voids. In addition to any of the above features in this paragraph, the air voids may be configured to absorb sound, and the channels may define a path for sound among the air voids. In addition to any of the above features in this paragraph, the path for sound may be a generally maze-like structure. In addition to any of the above features in this paragraph, the defined path may provide a Helmholtz resonator. In addition to any of the above features in this paragraph, the core may be free of external perforations. In addition to any of the above features in this paragraph, the air void volume may be at least 60% of the core volume. In addition to any of the above features in this paragraph, the air voids may have diameters in a first distribution having a mean; wherein the channels have diameters in a second distribution having a mean; and wherein the mean of the first distribution is at least 25% of the mean of the second distribution. In addition to any of the above features in this paragraph, the mean of the first distribution may be between about 20 microns and about 200 microns; and the mean of the second distribution may be between about 10 microns and about 50 microns. In addition to any of the above features in this paragraph, the mean of the first distribution may be between about 20 microns and about 200 microns; and the mean of the second distribution may be between about 20 microns and about 50 microns. In addition to any of the above features in this paragraph, the gypsum may comprise calcium sulfate dihydrate. In addition to any of the above features in this paragraph, the gypsum may comprise synthetic gypsum, natural gypsum, or a combination of synthetic and natural gypsum. In addition to any of the above features in this paragraph, the reinforcing fiber, if included, may comprise glass fiber. In addition to any of the above features in this paragraph, the uncooked starch may comprise an acid-modified starch. In addition to any of the above features in this paragraph, the set gypsum core may have a density between about 15 pcf to about 25 pcf, and an e-NRC of at least about 0.3, according to ASTM E1050-98. In addition to any of the above features in this paragraph, the set gypsum core may have a compressive strength of at least about 100 psi.

Additional embodiments disclosed herein provide, among other things, a set gypsum core, the core being formed from an air-foamed stucco slurry comprising stucco, at least one uncooked starch and an aqueous foam, the uncooked starch being in the amount of at least 4% by weight of the dry stucco, the air-foamed stucco slurry having air bubbles distributed therein; wherein the core is set to provide an interlocking matrix of set gypsum, wherein the air bubbles form air voids distributed within the interlocking matrix, and wherein granules of the uncooked starch are distributed within the interlocking matrix between the air voids and within cell walls of the air voids; and wherein the set core is heated to at least a gelatinizing temperature, wherein the granules of the uncooked starch gelatinize to provide channels distributed within the interlocking matrix and interconnecting the air voids. In addition to any of the above features in this paragraph, the gelatinized granules may migrate into the set gypsum matrix when the set core is heated to the at least a gelatinizing temperature. In addition to any of the above features in this paragraph, the uncooked starch may be in an amount of at least a 2× multiple of a binding amount of the uncooked starch for the interlocking matrix. In addition to any of the above features in this paragraph, the air-foamed stucco slurry may comprise: a slurry comprising stucco and at least one uncooked starch, the uncooked starch being in the amount of at least 4% or, alternatively, at least 6% by weight of the dry stucco; the slurry being combined with an aqueous foam comprising the foaming agent, water, and air. In addition to any of the above features in this paragraph, the air-foamed stucco slurry may further comprise a reinforcing fiber. In addition to any of the above features in this paragraph, the reinforcing fiber may be distributed throughout the interlocking matrix of the set gypsum core. In addition to any of the above features in this paragraph, the stucco may comprise calcium sulfate hemihydrate. In addition to any of the above features in this paragraph, the stucco may be formed from synthetic gypsum, natural gypsum, or a combination of synthetic and natural gypsum. In addition to any of the above features in this paragraph, the water to stucco ratio (weight/weight) in the air-foamed stucco slurry may be between about 70% and about 120%. In addition to any of the above features in this paragraph, the foaming agent and the water may comprise a 1% (weight) solution of the foaming agent. In addition to any of the above features in this paragraph, the foaming agent may comprise a stable soap. In addition to any of the above features in this paragraph, the slurry may further comprise a water reducing agent. In addition to any of the above features in this paragraph, the water reducing agent may comprise polycarboxylate ether (PCE). In addition to any of the above features in this paragraph, the water reducing agent may comprise polynaphthalene sulfate. In addition to any of the above features in this paragraph, the slurry may further comprise a sagging-resistant agent. In addition to any of the above features in this paragraph, the sagging-resistant agent may comprise sodium trimetaphosphate, boric acid and/or tartaric acid. In addition to any of the above features in this paragraph, the slurry may further comprise a stabilizer.

Additional embodiments of the invention provide, among other things, a gypsum acoustic panel, comprising: an acoustic layer comprising an open cell set gypsum core, the open cell set gypsum core comprising an interlocking matrix of gypsum, the interlocking matrix having air voids distributed therein, the air voids defining cells having cell walls formed by the interlocking matrix, the interlocking matrix further having channels distributed therein, the channels interconnecting the air voids, the channels comprising openings in the cell walls; and at least one backing sheet facing an outer surface of the acoustic layer. In addition to any of the above features in this paragraph, at least 30% of the air cells may be interconnected to another of the air cells by at least one of the channels. In addition to any of the above features in this paragraph, the cell walls of at least 30% of the air cells may have at least one of the openings formed therein. In addition to any of the above features in this paragraph, the cell walls of substantially all of the air cells may have at least one of the openings formed therein. In addition to any of the above features in this paragraph, the openings may be generally circular in cross-sectional shape. In addition to any of the above features in this paragraph, the set gypsum core may further comprise reinforcing fiber distributed throughout the reinforcing matrix. In addition to any of the above features in this paragraph, the gypsum may comprise synthetic gypsum, natural gypsum, or a combination of synthetic and natural gypsum. In addition to any of the above features in this paragraph, the gypsum may be synthetic gypsum. In addition to any of the above features in this paragraph, the gypsum may be natural gypsum. In addition to any of the above features in this paragraph, the backing sheet may comprise one or more of non-woven glass face, metallic foil, paper, a laminate comprising paper and a metallic foil, or combinations thereof. In addition to any of the above features in this paragraph, the backing sheet may be disposed directly on the acoustic layer. In addition to any of the above features in this paragraph, the gypsum acoustic panel may further comprise: a densified layer being denser than the open cell gypsum core, the densified layer being positioned between the acoustic layer and the backing sheet, wherein the densified layer comprises an interlocking matrix of set gypsum. In addition to any of the above features in this paragraph, the gypsum acoustic panel may further comprise: an additional layer disposed between the densified layer and the backing sheet. In addition to any of the above features in this paragraph, the additional layer may comprise one or more of paper, non-woven fiberglass, woven fiberglass, synthetic fiber, or a combination.

Additional embodiments provide, among other things, an air-foamed slurry for making an acoustic panel comprising: a slurry formed from a dry mixture combined with water, the dry mixture comprising stucco, reinforcing fiber, and at least one uncooked starch, the uncooked starch being in the amount of at least 6% by weight of the dry stucco; and an aqueous foam comprising a foaming agent, additional water, and air; wherein the water to stucco ratio in the air-foamed slurry is between about 60% and about 120%. In addition to any of the above features in this paragraph, the water to stucco ratio in the air-foamed slurry may be about 85%. In addition to any of the above features in this paragraph, the dry mixture may be combined with a wet mixture comprising the water. In addition to any of the above features in this paragraph, the wet mixture may further comprise at least one of a dispersant, a retarder, a sagging-resistant agent, or a combination. In addition to any of the above features in this paragraph, the wet mixture may further comprise a dispersant. In addition to any of the above features in this paragraph, the dispersant comprises polycarboxylate ether (PCE). In addition to any of the above features in this paragraph, the reinforcing fiber comprises glass fiber. In addition to any of the above features in this paragraph, the stucco comprises calcium sulfate hemihydrate. In addition to any of the above features in this paragraph, the stucco may be formed from synthetic gypsum, natural gypsum, or a combination of synthetic and natural gypsum. In addition to any of the above features in this paragraph, the aqueous foam may comprise air combined with a solution of a foaming agent and the additional water. In addition to any of the above features in this paragraph, the foaming agent may comprise a stable soap. In addition to any of the above features in this paragraph, the foaming agent may further comprise an unstable soap.

Additional embodiments provide a method for making a set gypsum core, the method comprising: forming an air-foamed stucco slurry comprising stucco, at least one uncooked starch, and an aqueous foam, the uncooked starch being in the amount of at least 4% by weight of the dry stucco, the air-foamed stucco slurry having air bubbles distributed therein; forming a core from the air-foamed slurry; allowing the core to set to provide an interlocking matrix of set gypsum, wherein the air bubbles form air voids distributed within the interlocking matrix, and wherein granules of the uncooked starch are distributed within the interlocking matrix between the air voids and within cell walls of the air voids; and heating the set core to at least a gelatinizing temperature, wherein the granules of the uncooked starch gelatinize to provide channels distributed within the interlocking matrix and interconnecting the air voids. In addition to any of the above features in this paragraph, the gelatinized granules may migrate into the set gypsum matrix when the set core is heated to the at least a gelatinizing temperature. In addition to any of the above features in this paragraph, the uncooked starch may be in an amount of at least a 2× multiple of a binding amount of the uncooked starch for the interlocking matrix. In addition to any of the above features in this paragraph, forming the air-foamed stucco slurry may comprise: forming a slurry comprising the stucco, the at least one uncooked starch, and water; and combining the formed slurry with an aqueous foam comprising foaming agent, additional water, and air. In addition to any of the above features in this paragraph, the air-foamed slurry may further comprise reinforcing fiber. In addition to any of the above features in this paragraph, the stucco may comprise calcium sulfate hemihydrate. In addition to any of the above features in this paragraph, the stucco may be formed from synthetic gypsum, natural gypsum, or a combination of synthetic and natural gypsum. In addition to any of the above features in this paragraph, the slurry may further comprise a reinforcing fiber. In addition to any of the above features in this paragraph, the water to stucco ratio in the air-foamed stucco slurry (weight/weight) may be between about 70% and about 120%. In addition to any of the above features in this paragraph, the foaming agent and the water may comprise a 1% (by weight) foaming agent solution. In addition to any of the above features in this paragraph, the foaming agent may comprise a stable soap. In addition to any of the above features in this paragraph, the method may further comprise: mixing the foaming agent, additional water, and air to provide the aqueous foam. In addition to any of the above features in this paragraph, the air may be introduced at an air rate of 5.0 L/min. In addition to any of the above features in this paragraph, the foaming agent and the water may comprise an about 1% (by weight) foaming agent solution, and wherein a flow rate of the foaming agent solution may be about 40 lb/min. In addition to any of the above features in this paragraph, the slurry may further comprise a sagging-resistant agent. In addition to any of the above features in this paragraph, the slurry may further comprise a dispersant. In addition to any of the above features in this paragraph, the dispersant may comprise polycarboxylate ether (PCE). In addition to any of the above features in this paragraph, the gelatinizing temperature may be at least 170° F. In addition to any of the above features in this paragraph, the heating may be at a temperature of at least 350° F. In addition to any of the above features in this paragraph, the heating may be at a temperature between about 350° F. and about 450° F.

Additional embodiments provide, among other things, a method for making an acoustic panel, the method comprising: forming a slurry comprising stucco, at least one uncooked starch, and water, the uncooked starch being in the amount of at least 4% by weight of the dry stucco; adding a foam to the slurry to provide an air-foamed slurry, the air-foamed stucco slurry having air bubbles distributed therein; forming a continuous strip of the air-foamed slurry; cutting the strip to form the acoustic panel; allowing the gypsum to set to provide an interlocking matrix of set gypsum, wherein the air bubbles form air voids distributed within the interlocking matrix, and wherein granules of the uncooked starch are distributed within the interlocking matrix between the air voids and within cell walls of the air voids; and heating the set gypsum matrix to at least a gelatinizing temperature, wherein the granules of the uncooked starch gelatinize to provide channels distributed within the interlocking matrix and interconnecting the air voids. In addition to any of the above features in this paragraph, the uncooked starch may be in an amount of at least a 2× multiple of a binding amount of the uncooked starch for the interlocking matrix. In addition to any of the above features in this paragraph, excess water from the slurry may be present after allowing the gypsum to set, wherein heating the set gypsum may cause the gelatinized starch granules to dissolve in the excess water, wherein the dissolved starch granules migrate into the gypsum matrix. In addition to any of the above features in this paragraph, the gelatinizing temperature may be at least 170° F. In addition to any of the above features in this paragraph, the heating may be at a temperature of at least 350° F. In addition to any of the above features in this paragraph, the heating may be at a temperature between about 350° F. and about 450° F. In addition to any of the above features in this paragraph, the heating may comprise: first heating at a temperature between 400° F. and 450° F.; and second heating at a temperature between 350° F. and 400° F. In addition to any of the above features in this paragraph, the stucco may be formed from synthetic gypsum, natural gypsum, or a combination of synthetic and natural gypsum. In addition to any of the above features in this paragraph, the slurry may further comprise a reinforcing fiber. In addition to any of the above features in this paragraph, the method may further comprise: positioning a scrim layer to receive the slurry, wherein the continuous strip of said forming is formed by distributing the slurry over the scrim layer. In addition to any of the above features in this paragraph, the method may further comprise: dividing the slurry into a main stream and a slip stream prior to the forming; and making a densified layer from the slip stream; wherein the continuous strip of said forming is formed by distributing the slurry over the densified layer. In addition to any of the above features in this paragraph, the method may further comprise: positioning a backing layer to receive the slurry, wherein the continuous strip of said forming is formed by distributing the slurry over the backing layer. In addition to any of the above features in this paragraph, the method may further comprise: applying the acoustic panel to a ceiling. In addition to any of the above features in this paragraph, the method may further comprise: applying the acoustic panel to a wall.

Additional embodiments provide, among other things, a set gypsum core as described herein.

Additional embodiments provide, among other things, a method for making a set gypsum core as described herein.

Additional embodiments provide, among other things, a set gypsum core made using a method as described herein.

Additional embodiments provide, among other things, an acoustic panel as described herein.

General

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. It will be readily understood that the aspects of the present disclosure, as generally described herein, and illustrated in the FIGURES, can be arranged, substituted, combined, separated, and designed in a wide variety of different configurations, all of which are explicitly contemplated herein. In other words, the described embodiments are not mutually exclusive, and permutations of one or more embodiments with one another remain within the scope of this disclosure. Other embodiments may be utilized, and other changes may be made, without departing from the scope of the subject matter presented herein.

Any of the above aspects and embodiments can be combined with any other aspect or embodiment as disclosed here in the Summary, FIGURES and/or Detailed Description sections, except where such combinations would be infeasible as will be appreciated by an artisan.

As used in this specification and the claims, the singular forms "a," "an" and "the" include plural referents unless the context clearly dictates otherwise.

Unless specifically stated or obvious from context, as used herein, the term "or" is understood to be inclusive and covers both "or" and "and."

Unless specifically stated or obvious from context, as used herein, the term "about" is understood as within a range of normal tolerance in the art, for example within 2 standard deviations of the mean. About can be understood as within 20%, 19%, 18%, 17%, 16%, 15%, 14%, 13%, 12%, 11%, 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless specifically stated or obvious from context, as used herein, the terms "substantially all", "substantially most of", "substantially all of" or "majority of" encompass at least about 90%, 95%, 97%, 98%, 99% or 99.5%, or more of a referenced amount of a composition.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Incorporation by reference of these documents, standing alone, should not be construed as an assertion or admission that any portion of the contents of any document is considered to be essential material for satisfying any national or regional statutory disclosure requirement for patent applications. Notwithstanding, the right is reserved for relying upon any of such documents, where appropriate, for providing material deemed essential to the claimed subject matter by an examining authority or court.

Modifications may be made to the foregoing without departing from the basic aspects of the invention. Although the invention has been described in substantial detail with reference to one or more specific embodiments, those of ordinary skill in the art will recognize that changes may be made to the embodiments specifically disclosed in this application, and yet these modifications and improvements are within the scope and spirit of the invention. The invention illustratively described herein suitably may be practiced in the absence of any element(s) not specifically disclosed herein. Thus, for example, in each instance herein any of the terms "comprising", "consisting essentially of", and "consisting of" may be replaced with either of the other two terms. Thus, the terms and expressions which have been employed are used as terms of description and not of limitation, equivalents of the features shown and described, or portions thereof, are not excluded, and it is recognized that various modifications are possible within the scope of the invention. Embodiments of the invention are set forth in the following claims.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. An open cell set gypsum core comprising:
   a. an interlocking matrix of gypsum having air voids distributed therein, the air voids defining cells having cell walls formed by the interlocking matrix;
   b. the interlocking matrix further having channels distributed therein, the channels interconnecting the air voids, the channels comprising openings in the cell walls formed by starch granules after dissolving, the starch granules being disposed in the cell walls of the set gypsum core before dissolving, wherein at least 30% of the air voids are interconnected to another of the air voids by at least one of the channels.

2. The core of claim 1, wherein at least 60% of the air voids are interconnected to another of the air voids by at least one of the channels.

3. The core of claim 1, wherein the openings are generally circular or elliptical in cross-sectional shape.

4. The core of claim 1, wherein each of a plurality of the channels comprises a first opening in a first cell wall of a first air void and a second opening in a second cell wall of a second air void.

5. The core of claim 1, wherein the core is not externally perforated.

6. The core of claim 1, wherein the air void volume is at least 60% of the core volume.

7. The core of claim 1:
   a. wherein the air voids have a mean diameter between 50 and 200 microns;
   b. wherein the channels have a mean diameter between 10 and 50 microns; and
   c. wherein the mean diameter of the channels is smaller than the mean diameter of the air voids.

8. The core of claim 1, wherein the gypsum comprises synthetic gypsum.

9. The core of claim 1, wherein the gypsum comprises natural gypsum.

10. The core of claim 1, further comprising reinforcing fiber distributed throughout the interlocking matrix.

11. The core of claim 1, wherein the reinforcing fiber comprises glass fiber.

12. A set gypsum core, the core being formed from an air-foamed stucco slurry comprising stucco, at least one uncooked starch and an aqueous foam, the uncooked starch being in the amount of at least 4% by weight of the dry stucco, the air-foamed stucco slurry having air bubbles distributed therein;
   a. wherein the core is set to provide an interlocking matrix of set gypsum, wherein the air bubbles form air voids distributed within the interlocking matrix, and wherein granules of the uncooked starch are distributed within the interlocking matrix between the air voids and within cell walls of the air voids, wherein the uncooked starch is included in the air-foamed stucco slurry in an amount that is at least a 2x multiple of a binding amount of the uncooked starch for the interlocking matrix; and b. wherein the set core is heated to at least a gelatinizing temperature, wherein the granules of the uncooked starch gelatinize to provide channels distributed within the interlocking matrix and interconnecting the air voids, wherein at least 30% of the air voids are interconnected to another of the air voids by at least one of the channels.

13. The set gypsum core of claim 12, wherein the air-foamed stucco slurry further comprises a reinforcing fiber that is distributed throughout the interlocking matrix of the set gypsum core.

14. The set gypsum core of claim 12, wherein the stucco comprises synthetic gypsum.

15. A gypsum acoustic panel, comprising:
a. an acoustic layer comprising an open cell set gypsum core, the open cell set gypsum core comprising an interlocking matrix of at least gypsum, the interlocking matrix having air voids distributed therein, the air voids defining cells having cell walls formed by the interlocking matrix, the interlocking matrix further having channels distributed therein, the channels interconnecting the air voids, the channels comprising openings in the cell walls formed by starch granules after dissolving, the starch granules being disposed in the cell walls of the set gypsum core before dissolving, wherein at least 30% of the air voids are interconnected to another of the air voids by at least one of the channels; and
b. at least one backing sheet facing an outer surface of the acoustic layer.

16. The gypsum acoustic panel of claim 15, wherein at least 60% of the air voids are interconnected to another of the air cells-voids by at least one of the channels.

17. The gypsum acoustic panel of claim 15, wherein the set gypsum core further comprises reinforcing fiber distributed throughout the interlocking matrix.

18. The gypsum acoustic panel of claim 15, wherein the gypsum comprises synthetic gypsum.

19. The gypsum acoustic panel of claim 15, wherein the backing sheet comprises one or more of non-woven glass face, metallic foil, paper, a laminate comprising paper and a metallic foil, or combinations thereof.

* * * * *